United States Patent [19]

Nakazawa

[11] Patent Number: 5,448,078
[45] Date of Patent: Sep. 5, 1995

[54] BAR CODE OR OPTICAL DATA READER WHICH ADJUSTS FOCAL LENGTH BASED ON DETECTED DISTANCE TO CODED SURFACE

[75] Inventor: Atsushi Nakazawa, Osaka, Japan

[73] Assignee: Sumitomo Electric Industries, Ltd., Osaka, Japan

[21] Appl. No.: 179,941

[22] Filed: Jan. 11, 1994

[30] Foreign Application Priority Data

Jan. 11, 1993 [JP] Japan .................. 5-002732

[51] Int. Cl.⁶ .............................. G01N 21/86
[52] U.S. Cl. .................. 250/559.24; 250/566
[58] Field of Search ............ 250/201.2, 201.4, 201.5, 250/561, 560, 566; 235/462, 472

[56] References Cited

U.S. PATENT DOCUMENTS

| | | | |
|---|---|---|---|
| 4,417,817 | 11/1983 | Böhme et al. | 356/380 |
| 4,578,571 | 3/1986 | Williams | 235/472 |
| 5,122,644 | 6/1992 | Hasegawa et al. | 235/462 |
| 5,266,810 | 11/1993 | Murphy | 250/560 |
| 5,308,966 | 5/1994 | Danielson et al. | 235/472 |

FOREIGN PATENT DOCUMENTS

| | | |
|---|---|---|
| 1189782 | 7/1989 | Japan . |
| 27182 | 1/1990 | Japan . |
| 2133891 | 5/1990 | Japan . |
| 2170290 | 7/1990 | Japan . |

*Primary Examiner*—David C. Nelms
*Assistant Examiner*—Steven L. Nichols
*Attorney, Agent, or Firm*—Cushman Darby & Cushman

[57] ABSTRACT

Scan units scan top surfaces of articles A and B with a laser beam as they are transported by a conveyor belt. The scan units are capable of changing the focal position of the laser beam within a predetermined range. Changing the focal position of the laser beam requires a predetermined response time. The heights of articles A and B are detected by a height detection unit in an amount of time equal to or less than the response time before they are scanned by the laser beam. When the heights of the articles as detected by the height detection unit change, a control unit will change at predetermined time intervals the focal position of the laser beam that is generated by each of the scan units. This allows the top surfaces of articles A and B, which are transported at short time intervals, to be scanned efficiently with the focused laser beam, permitting the efficient reading of bar codes and any other symbols that are formed on the top surfaces of articles A and B.

12 Claims, 10 Drawing Sheets

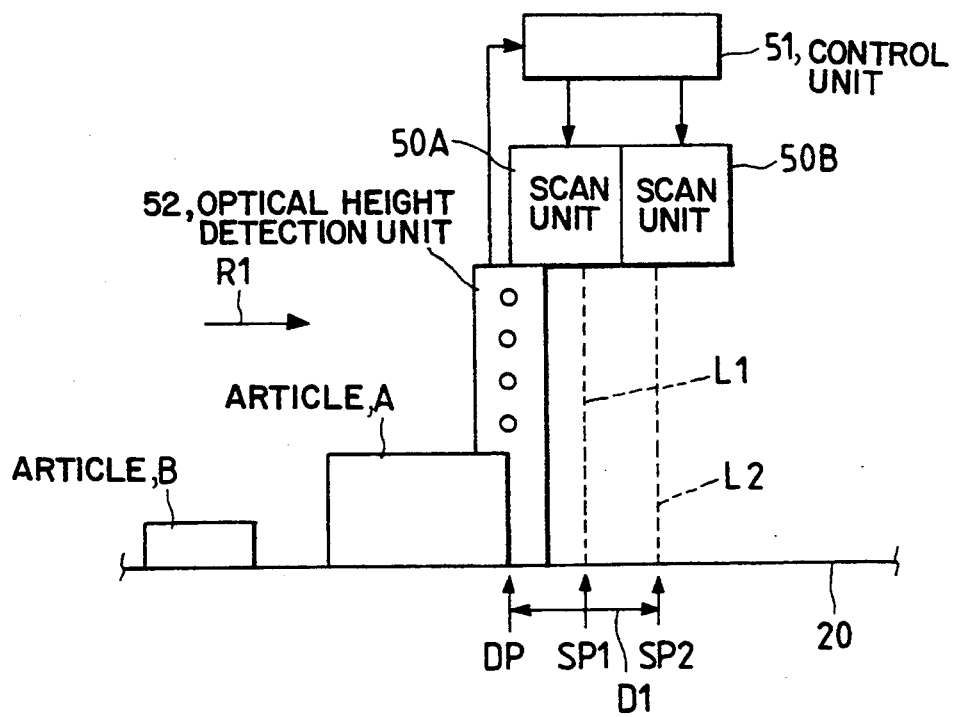
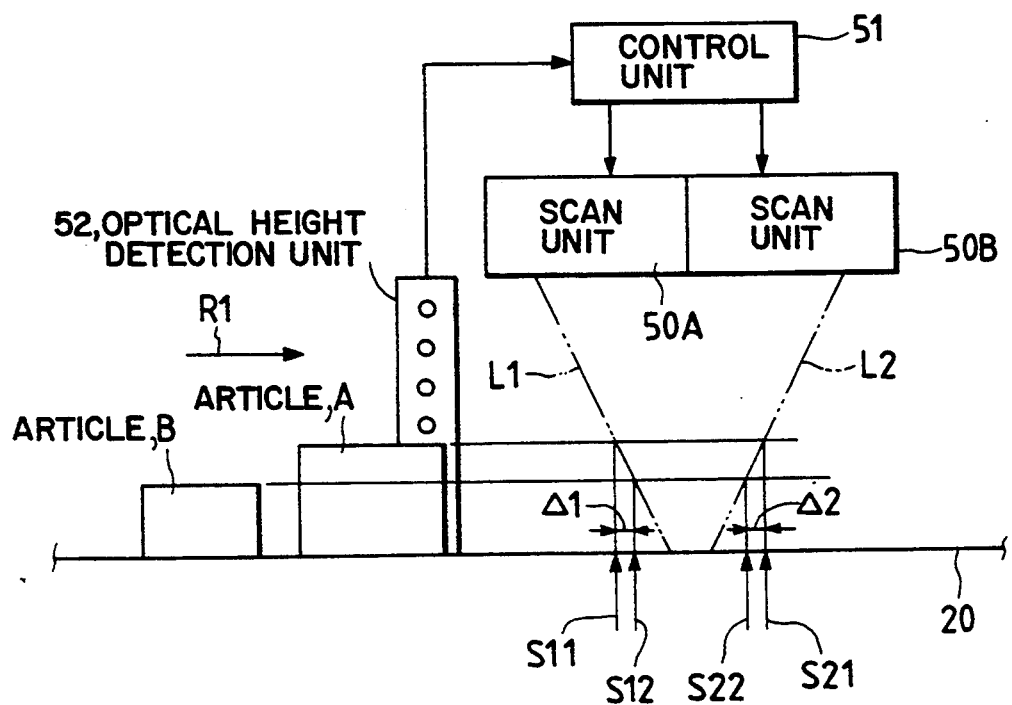

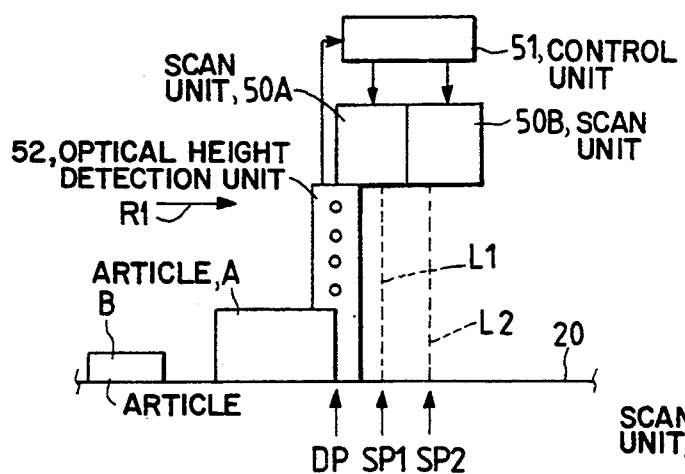
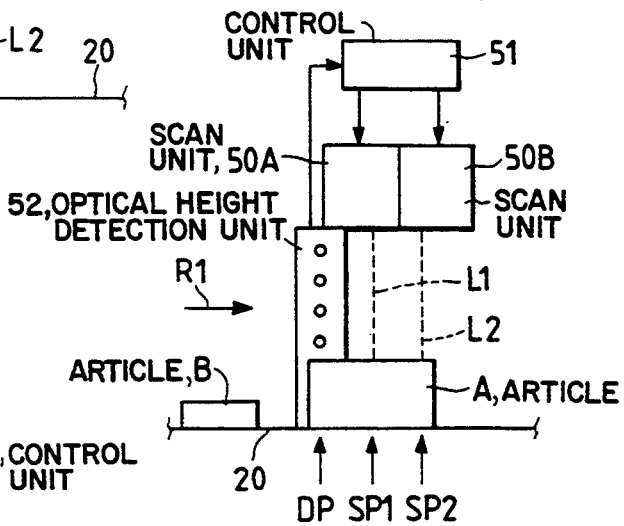
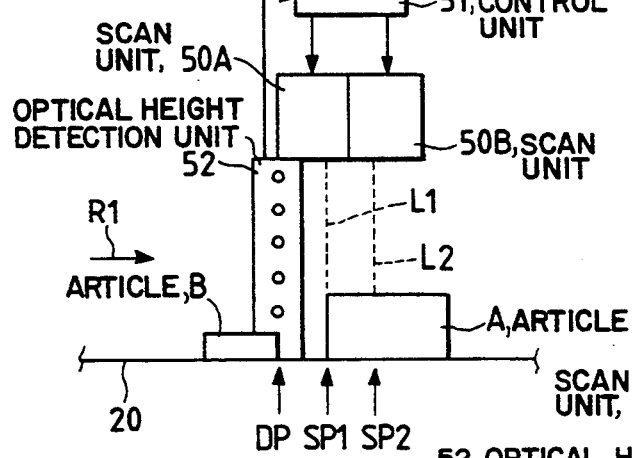
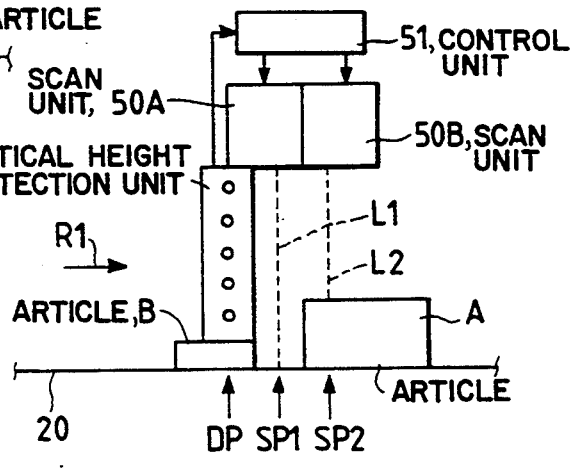

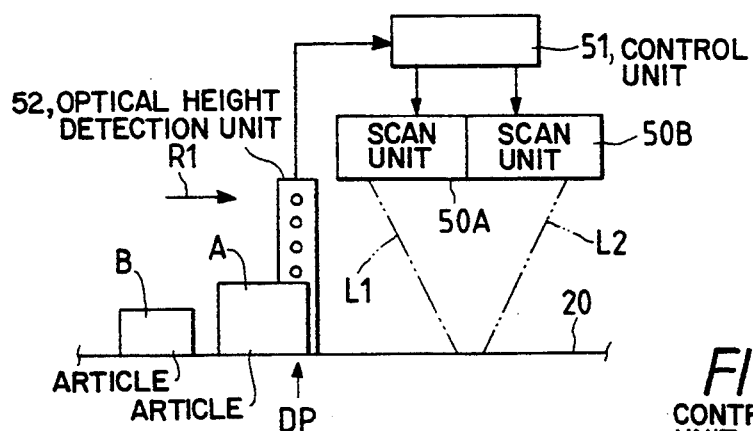
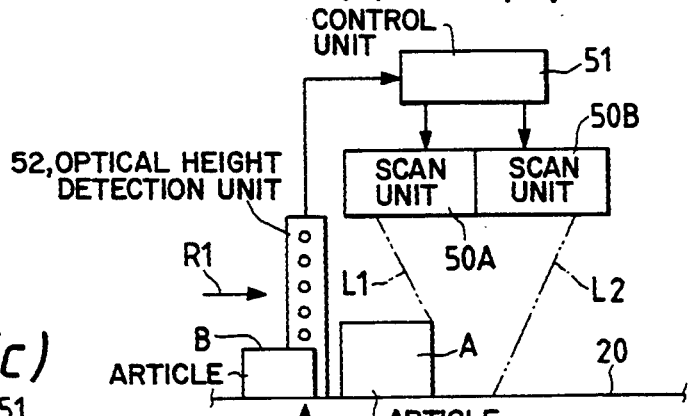
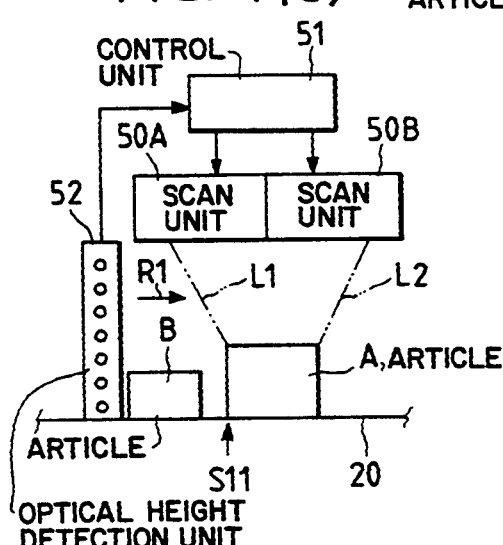
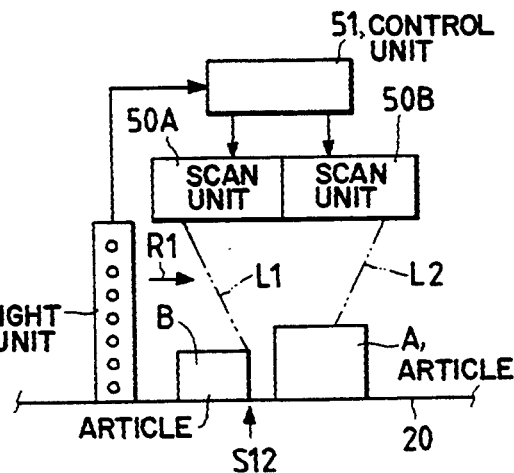

BAR CODE OR OPTICAL DATA READER WHICH ADJUSTS FOCAL LENGTH BASED ON DETECTED DISTANCE TO CODED SURFACE

BACKGROUND OF THE INVENTION

1. Field of the Invention

The present invention relates to an optical scanner used for reading bar codes and other symbols.

2. Description of the Related Art

Symbols such as bar codes and characters are conventionally read by optical means where a laser beam scans the surfaces on which the symbols are formed, causing the reflected light from the scanned surfaces to be received by an appropriate light-receiving device. The light-receiving device outputs signals that are associated with the intensity of the reflected light. Accordingly, when a bar code, which consists of black bars and white spaces, is scanned, small signals are produced for the bars and large signals for the spaces. Then, if the outputs of the light-receiving device, after optional amplification, are binarized through differentiation by an appropriate slice level, a binary signal that is associated with the particular bar code can be produced.

The light source for generating laser beams has heretofore been a He-Ne laser, but the use of semiconductor lasers has increased in order to reduce the size and weight of the overall equipment. However, since the laser light emitted from semiconductor lasers is highly diffusive, the output light is usually focused by a lens or other suitable optical members to create a substantially collimated laser beam. Bars in bar codes can be as narrow as 0.2 mm or less, and in order to resolve such fine-line bar codes with laser beams, the latter must be focused to a beam spot diameter of no more than 0.2 mm. Hence, the laser beam that is used on bar code and other symbol readers is not completely parallel light, but converging light having a focus point.

At its focus and in nearby areas, the converging laser beam has a small enough spot diameter to enable the reading of symbols with high resolution. On the other hand, symbol resolution deteriorates for symbols located at some distance from the focus of the laser beam. This inevitably causes the problem that a high resolution scan cannot be assured over a wide reading range, and in practice, bar codes that are formed on the surfaces of articles of different sizes may not be effectively read by a bar code or other symbol reader that is fixed above a conveyor belt transporting those articles. Stated more specifically, if the distance between the reader and the article's surface varies from one article to another, there is a high likelihood that the laser beam cannot be focused to an adequately small spot diameter on the article's surface, thereby reducing the scanner's effectiveness.

Two approaches have been taken in the art to solve this problem. The first solution is described in the documents of Japanese Patent Unexamined Publication Nos. Hei 2-170290, Hei 2-7182, etc. FIGS. 12(a) and 12(b) show part of the system configuration that is taught in Japanese Patent Unexamined Publication No. Hei 2-7182, supra. Light from a semiconductor laser 1 is focused by a condenser lens 2 to form a laser beam 3. The laser beam 3 has a beam waist BW at the focus with the focal length FL being determined by the relative positions of the light source 1 and the condenser lens 2. If a symbol such as a bar code is read in the position of beam waist BW, a maximum resolution can be attained.

In the prior art system shown in FIGS. 12(a) and 12(b), the condenser lens 2 is adapted to be movable in the direction 4 which is parallel to the optical axis of the lens, so that the focal length FL, or the distance from the light source 1 to the focal position, can be reduced as shown in FIG. 12(a) or increased as shown in FIG. 12(b).

In the system configuration described above, the condenser lens 2 is moved in accordance with the reading distance (or the distance from the reader to the bar code carrying surface of an article) in such a way that a beam waist BW is formed either on the bar code carrying surface or in its neighborhood. This enables the bar code to be read at a high resolution irrespective of the reading distance. As a result, bar codes can be read effectively over a broad reading range. However, the response time to bring the laser light into focus is fairly long (say, 0.1 second). This can lead to failure in reading bar codes that are printed on the top surfaces of articles being transported on a conveyor belt. Stated more specifically, if two articles having different heights are transported with little or no space between them, there may be insufficient time to adjust the focus of the laser light from the position associated with the first article to the position associated with the next article. This can potentially cause failures in reading the bar code on the next article. A further problem occurs if two articles of different heights come to be located on a single scan line; in this case, the laser beam can be brought into focus on only one of the two articles and, hence, the bar code on the other article cannot be read at all.

In order to avoid these problems and to insure that the bar codes on consecutively transported articles are read positively, an adequate interval must be provided between adjacent articles. But then not only the efficiency of transporting the articles but also the process speed of reading bar codes will decrease.

Take, for example, the case where a response time of 0.1 second is required to change the focal position of a laser beam and where articles are transported at a speed of 120 m/min (=200 cm/sec), with the length of the reading region (the scan region extending in the direction of transport) being 40 cm; then, the minimum distance d, or the interval that is required between adjacent articles is d=200×0.1+40=60 cm. As one can readily understand, the efficiency of transporting the articles is very low.

The second approach of solving the problem of the prior art is described in Japanese Patent Unexamined Publication Nos. Hei 2-133891, 1-189782, etc. The systems taught in these references have the common feature of having a plurality of beam emitting means that have their foci set at different reading distances and which are selectively operated in accordance with the specific reading distance. This arrangement is also capable of changing the focal position with the reading distance and, hence, symbols can be read at high resolution over a wide reading range. The beam emitting means each contain a semiconductor laser as a light source and a condenser lens.

This low-efficiency problem is absent from the second approach of the solution since the focal position of laser light can be changed rapidly by selectively operating a plurality of beam emitting means in accordance with the specific reading distance. However, if bars in the bar codes to be read are 0.2 mm wide, the depth of reading that can be assured for one beam emitting means is only about 10 cm. Therefore, in order to read bar codes that are formed on the surfaces of articles of varying sizes, ranging from envelopes (with a height of about zero cm) to big containers or packages (with a height of about 100 cm), at least ten beam emitting means must be used. This increases the complexity of the optics in the symbol reader, making it costly and extremely difficult to design.

The present invention solves the above complications by providing an optical scanner that is simple in construction and, yet, is capable of efficiently scanning articles that are presented in the scan region at short time intervals.

SUMMARY OF THE INVENTION

An object of the present invention is an optical scanner capable of efficiently scanning various size objects successively presented in a scan region with little or no distance or time interval between them. This is accomplished with an optical scanner and object detection means used in conjunction with a conveyor belt or similar means of transporting the objects to be scanned.

In general, a plurality of scanners are mounted overhead or alongside the conveyor belt so as to scan the objects as they pass by. Means for detecting an approaching object and its height is disposed downstream of the conveyor belt transporting the objects. The detecting means senses the height of the objects as they pass by and transmits this information to the control means. On the basis of the detected heights of the upcoming objects, the control means adjusts the focal position of the light used to scan the objects, thereby assuring an accurate reading of the bar codes or other informative symbol placed on the surface of the objects. To allow the control means enough time to adjust the focal positions appropriately, the detecting means is placed at a far enough distance away from a scanning position of the objects so that the time needed to transport the objects from the detecting means to the scanning position is at least equal to or greater than the time needed to adjust the focal positions.

BRIEF DESCRIPTION OF THE DRAWINGS

FIG. 4 is a diagram showing the configuration of a bar code reader that adopts an optical scanner according to a second embodiment of the present invention;

FIGS. 5(a) through 5(d) are diagrams showing the time sequence of the process of reading bar codes according to the second embodiment of the invention;

FIG. 6 is a diagram showing the configuration of a bar code reader that adopts an optical scanner according to a third embodiment of the present invention;

FIGS. 7(a) through 7(d) are diagrams showing the time sequence of the first half of the process of reading bar codes according to the third embodiment of the invention;

DETAILED DESCRIPTION OF THE PREFERRED EMBODIMENTS

Various embodiments of the present invention are described below with reference to the accompanying drawings.

Figure 1:
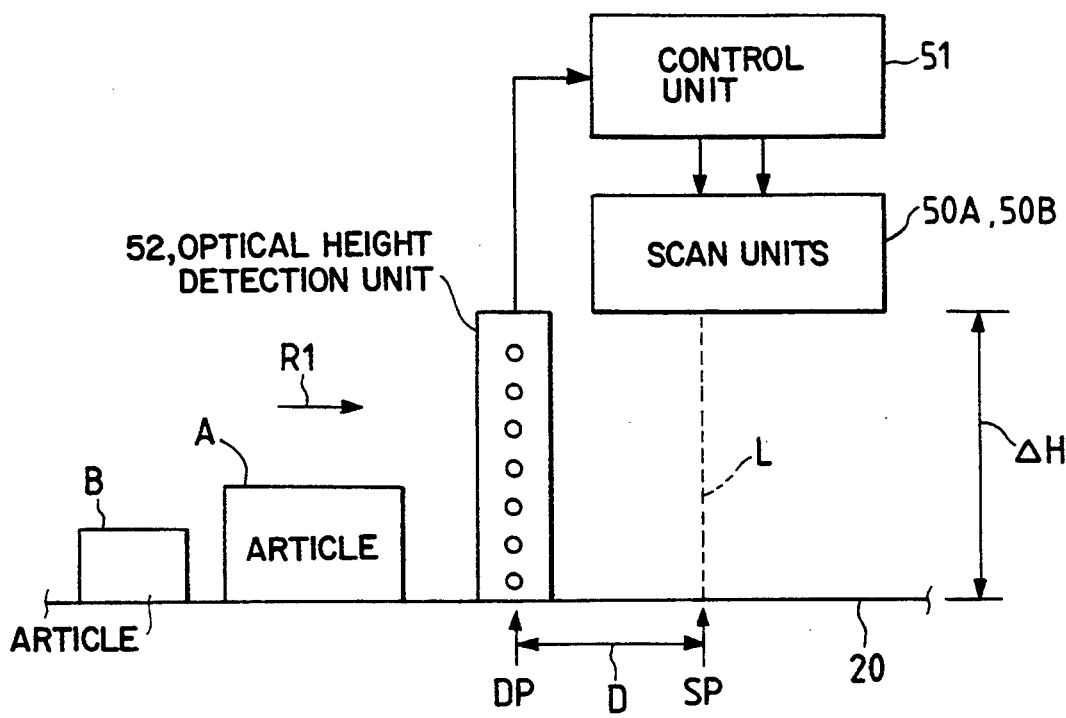
FIG. 1 is a diagram showing the configuration of a bar code reader that adopts an optical scanner according to a first embodiment of the present invention.

FIG. 1 is a diagram showing the basic configuration of a bar code reader that adopts an optical scanner according to a first embodiment of the present invention. The bar code reader scans the bar codes on the top surfaces of articles A and B as they are transported on a conveyor belt 20 at a constant speed in the direction indicated by arrow R1.

A first scan unit 50A and a second scan unit 50B are provided above the conveyor belt 20 by a predetermined distance (note that only one scan body is shown in FIG. 1). Scan units 50A and 50B scan the top surfaces of articles in a predetermined scan position SP by means of scanning light or laser beam L onto the articles as they are transported on the conveyor belt 20. This scanning operation is typically performed in a direction perpendicular to R1, or the transport direction of articles on the conveyor belt 20, where scan units 50A and 50B form a scan line in the scan position SP. The top surfaces of the articles to be scanned are then successively presented in the laser beam (L) scan region as they are transported by the conveyor belt 20.

The scan units 50A and 50B are capable of varying the focal position of laser beam L either continuously or stepwise within a predetermined range ΔH that extends from the surface of the conveyor belt 20 to the height of each scan unit. Each scan unit is capable of independent control of the focal position of its respective laser beam L by a control unit 51. Stated more specifically, the scan units 50A and 50B each have optics that comprise a semiconductor laser as a light source, a condenser lens that condenses the light from said semiconductor laser to form a laser beam that is substantially parallel light, and a polygonal mirror that reflects the light from the condenser lens while changing the optical path of the reflected laser beam at every moment. The focal position of laser beam L is varied by changing the distance between the semiconductor laser and the condenser lens under the control of control unit 51.

A predetermined detection point DP is set upstream of the scan position SP at a predetermined distance D taken in the direction R1 in which articles A and B are transported. At detection point DP is an optical height detection unit 52 or an ultrasonic height detection unit 54, which will be discussed later, that detects the height of an article as it is transported on the conveyor belt 20 and which supplies the result of detection to the control unit 51. Since the scan units 50A and 50B are mounted at a predetermined height, the height detection unit 52 can indirectly detect the distance from the scan unit 50A or 50B to the top surface of the article, thus working as range-finding means.

The distance between the scan position SP and the detection point DP is determined on the basis of the response time (say, 0.1 second) required by the scan unit 50A or 50B to alter the focal position of the laser light it generates. Distance D is set at such a value that the time required by a certain article to be transported to scan position SP after its height was detected at detection point DP will be greater than or equal to the above-defined response time. With this arrangement, height detection by unit 52 is effected so that the period of time between height detection of an article and presentment of the top surface of that article in the scan region of scan unit 50A or 50B is greater than or equal to the response times of unit 50A or 50B in altering the focal position of laser beam L.

When laser beam L scans the top surface of an article in scan position SP, the resulting reflected light is received by a light-receiving device (not shown). The output signal of the light-receiving device is binarized at an appropriate slice level for conversion to a binary signal associated with the scanned bar code. The resulting binary signal is supplied to a processor (not shown), where it is subjected to processing for recognition of the bar code.

In order to achieve selective detection of the reflected light associated with the light generated from scan unit 50A or 50B, laser beam L may be generated from the scan unit 50A or 50B on a time-sharing basis. Another approach that can be adopted is to modulate the laser beam L with different frequencies as it is generated from the scan unit 50A or 50B, followed by extracting signals of the respective frequencies from the output signal of the light-receiving device. Laser beams of different wavelengths may also be generated from the scan units 50A and 50B so that they are selectivity detected by passing them through optical filters.

Figure 2:
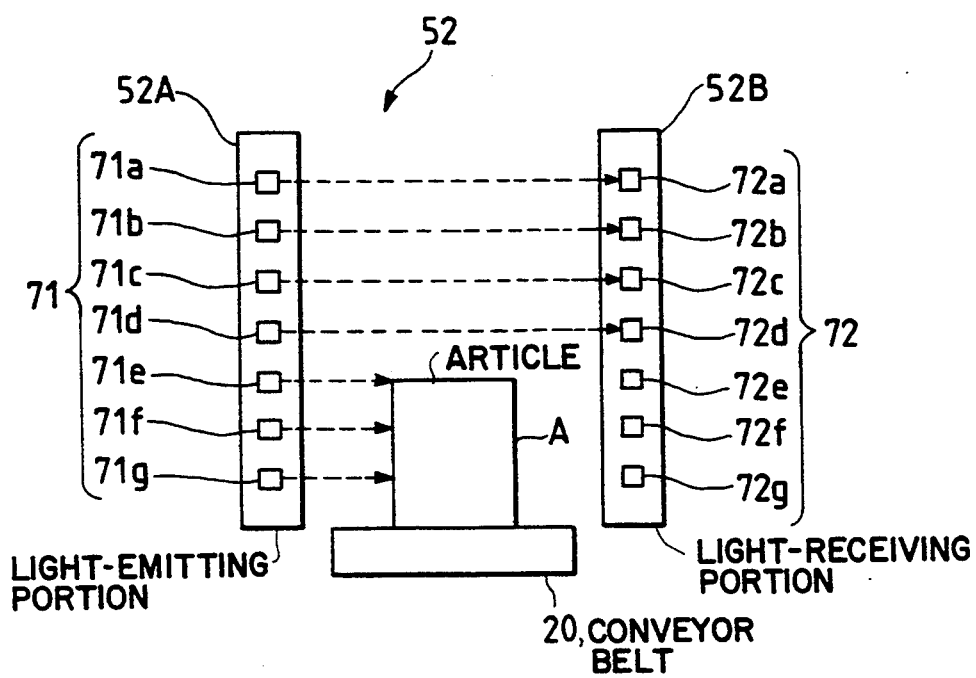
FIG. 2 is a simplified diagram showing the construction of the optical height detection unit.

FIG. 2 is a diagram showing the configuration of the height detection unit 52 in a simplified form. The height detection unit 52 is composed of a pair of light-emitting portions 52A and light-receiving portions 52B erected so as to face each other with the conveyor belt 20 being interposed. The light-emitting portion 52A comprises seven light-emitting devices 71a–71g, (which are hereafter referred to as "light-emitting devices 71") that are typically composed of light-emitting diodes (LED) and which are arranged vertically at given intervals. These light-emitting devices 71 generate light towards the light-receiving portion 52b. The side of the light-receiving portion 52B that faces the light-emitting portion 52A is provided with seven light-receiving devices 72a–72g (e.g. photo diodes, photo transistors, etc.) hereafter referred to as "light-receiving devices 72") that will receive the light as emitted from the respective light-emitting devices 71 and which are arranged vertically at given intervals.

With this arrangement, the light emitted from the individual light-emitting devices 71 will be received by all light-receiving devices 72 if nothing is carried on the conveyor belt 20. On the other hand, if article A is carried on the conveyor belt 20 as shown in FIG. 2, the light from the light-emitting devices 71a–71d are received by the corresponding light-receiving devices 72a–72d but the light from the light-emitting devices 71e–71g is blocked by article A and fails to be received by the light-receiving devices 72e–72g. This is how the height of an article on the conveyor belt 20 can be detected at eight levels on the basis of the profile of light detected by the seven light-receiving devices 72.

Figure 3A:
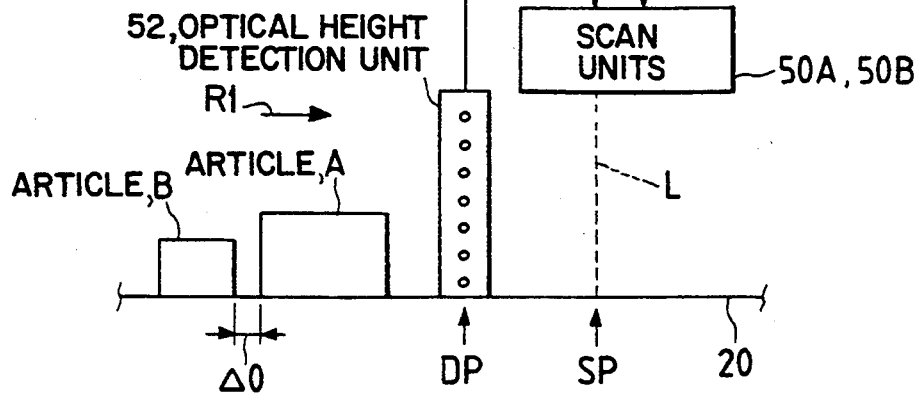
FIGS. 3(a) through 3(e) are diagrams showing the time sequence of the process of reading bar codes.

FIGS. 3(a)–3(e) are diagrams showing the time sequence of the operation of the above-described bar code reader. FIG. 3(a) assume that case where articles A and B are transported successively with little or no interval in between them. Specifically, the distance $\Delta 0$ between articles A and B is such (it may be zero in an extreme case) that the time required for the leading edge of article B to reach the scan position SP after the trailing edge of article A passed the scan position SP is shorter than the response time required for the scan unit 50A or 50B to adjust the focus of laser beam L to an appropriate position.

In response to the output of the height detection unit 52, the control unit 51 first varies the focal position of the scan unit 50A to the position associated with the height of the article being transported. When a given time (say, 0.3 second) passes after the focal position of the scan unit 50A is varied, the control unit 51 varies the focal position of the scan unit 50B in such a way that it complies with the detection result of the height detection unit 52.

The following Table 1 shows how the respective states illustrated in FIGS. 3(a) through 3(e) are related to the focal positions of the scan units 50A and 50B, as well as to the state of reading of the bar code. In Table 1, the focal position of laser beam L, as emitted from scan unit 50A or 50B, takes one of three values depending upon the profile detected by height detection unit 52: "0" if the laser beam is focused on the surface of the conveyor belt 20; "2" if the laser beam is focused on the surface of article B; and "3" if the laser beam is focused on the surface of article A.

TABLE 1

| State | Article at DP | Article at SP | Focal position 50A | Focal position 50B | State of reading |
|---|---|---|---|---|---|
| (a) | none | none | 0 | 0 | Nothing read |
| (b) | A | none | 0→3 | 0 | Nothing read |
| (c) | B | A | 3 | 0→3 | 50A reads A |
| (d) | B | A | 3→2 | 3 | 50B reads A |
| (e) | none | B | 2 | 3→2 | 50A reads B |

In the state shown in FIG. 3(a), both articles A and B are located upstream of the height detection unit 52 in the direction of transport R1. In this case, the focus of scan units 50A and 50B are set at the initial position "0".

Figure 3B:
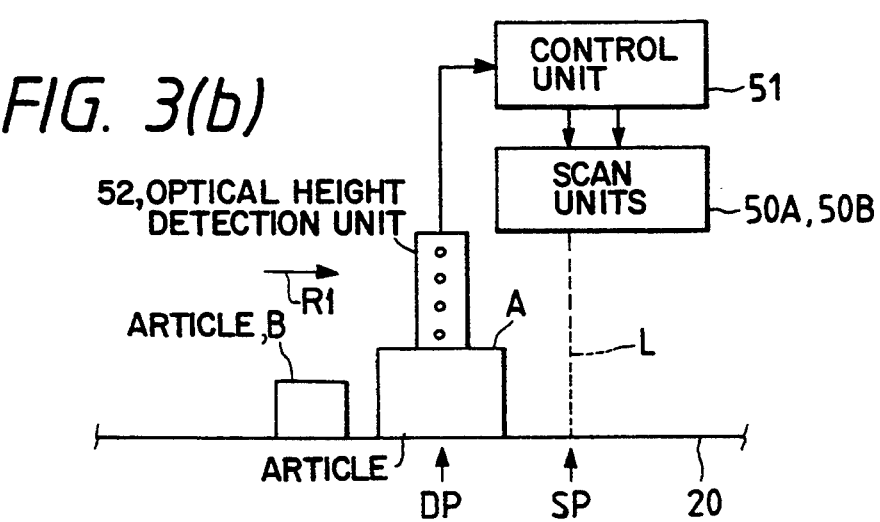

In the state shown in FIG. 3(b) where article A has reached detection point DP, the height of article A is detected by the height detection unit 52 and a signal associated with the result of the detection is entered into the control unit 51. In response to this signal, the control unit 51 supplies a control signal to the scan unit 50A, whereby the focal position of the scan unit 50A is switched to state "3" mentioned above. It should be mentioned that the focal position of the scan unit 50A does not change immediately but requires a certain response time for the change to occur. However, as mentioned above, the detection point DP is spaced from the scan position SP by distance D, so article A will never reach the scan position SP earlier than the response time needed for the scan unit to change states.

Figure 3C:
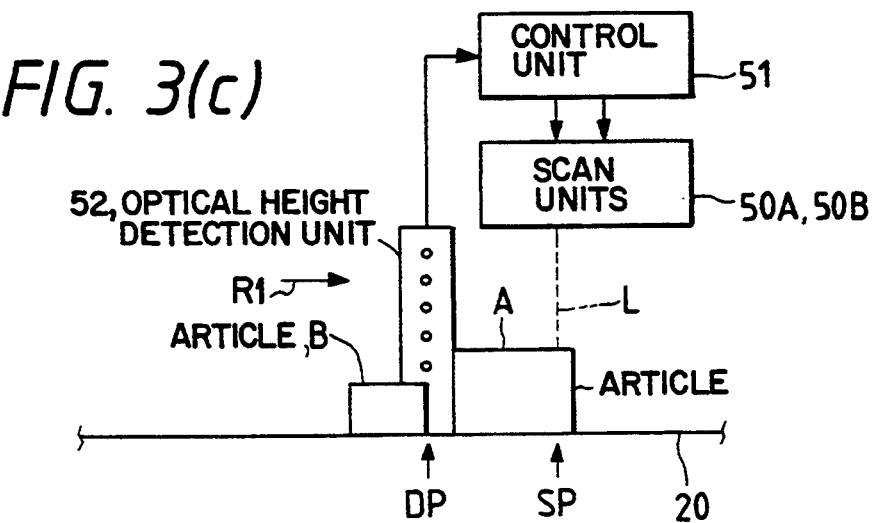
Figure 3D:
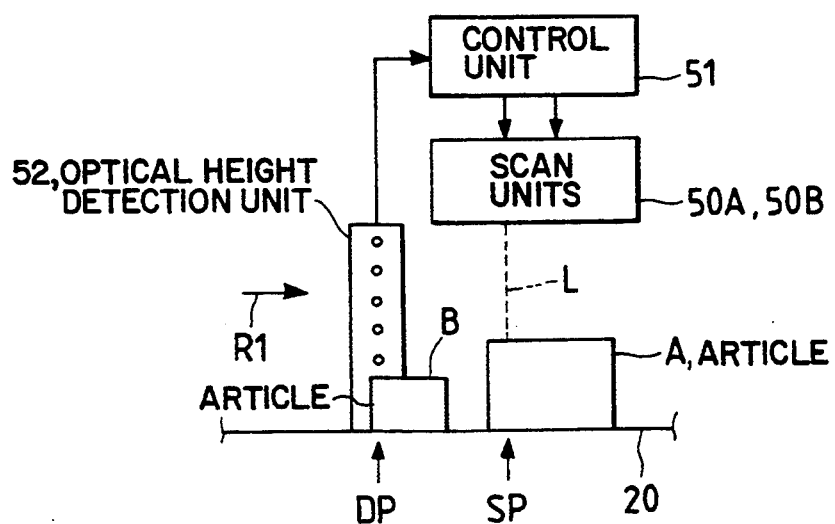

Therefore, in the state shown in FIG. 3(c) where article A has reached scan position SP the laser beam L as emitted from the scan unit 50A is focused at position "3" which is associated with the top surface of article A. Hence, if the scan unit 50A scans from the leading edge to the trailing edge of article A, the bar code formed on the top surface of article A can be read effectively. After supplying the scan unit 50A with a control signal for switching the focal position of laser beam L, the control unit 51 supplies the scan unit 50B with a control signal for again switching the focal position of laser beam L. This causes the focal position of the scan unit 50B to be switched from a "0" to "3" state after a certain response time. Thus, the focal position of scan unit 50B will assume the value "3" before the state shown in FIG. 3c is reached, where the article B arrives at detection point DP.

When the height detection unit 52 detects the height of article B, the control unit 51 responds by supplying a control signal for switching the focal position of scan unit 50A so that it will assume state "2" associated with the top surface of article B. As a result, the focal position of scan unit 50A will change from state "3" to "2". On this occasion, the neighborhood of the trailing edge of article A is still passing the scan position SP. Hence, the scan unit 50A is unable to read the bar code that is formed in the trailing edge portion of article A. However, the laser beam L from the scan unit 50B is focused at position "3" which is associated with the top surface of article A permitting the bar code under consideration to be read by scan unit 50B.

Figure 3E:
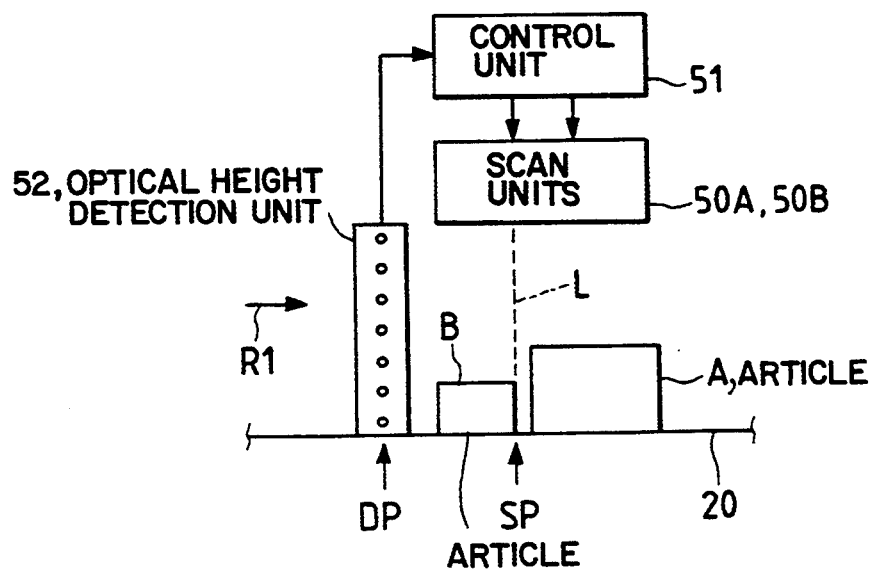

If articles A and B are further transported to reach the state shown in FIG. 3(e), the top surface of article B starts to be scanned. On this occasion, the laser beam L emitted from the scan unit 50A is focused at position "2" which is associated with article B and the focal position of laser beam L from the scan unit 50B is in the process of switching from state "3" to "2".

As described above, in accordance with the first embodiment of the present invention, the height of an article is detected so that the period of time between height detection of an article and presentment of the top surface of that article at scan position SP is greater than or equal to the response times of unit 50A or 50B in altering the focal position of laser beam L. When the article reaches the scan position SP, the focal position of the scan unit 50A will be set on the top surface of the article to be scanned. Thereafter, the focal position of the scan unit 50B is switched with a certain time lag behind the switching of the focal position of the scan unit 50A. Hence, even if the focal position of scan unit 50A is switched for scanning the next coming article, the article that is located in scan position SP at that point of time can be scanned effectively with the scan unit 50B.

This insures that even when articles are transported on the conveyor belt 20 so to be positioned very close to each other, all the bar codes that are formed on the articles can be positively read. Consequently, not only the efficiency of transporting the articles but also the process efficiency of reading the bar codes formed on the articles is markedly improved.

Furthermore, the two scan units 50A and 50B enable efficient scanning of the bar codes that are formed on articles of various sizes and, hence, compared to the prior art which selectively uses a multiple of beam issuing means depending on the focal position, the overall configuration of the system is simplified. This offers the advantage that no difficulty is involved in making optical settings while avoiding undue increase in cost.

FIG. 4 is a diagram showing the configuration of a bar code reader that adopts an optical reader according to a second embodiment of the present invention. In FIG. 4, those parts which correspond to the parts shown in FIG. 1 are identified by like numerals and symbols. In the second embodiment under consideration, a first scan unit 50A uses laser beam L1 to scan position SP1 which is close to detection point DP, or the position where detection by the height detection unit 52 is effected. A second scan unit 50B uses laser beam L2 to scan position SP2 which is downstream of the scan position SP1 in the direction of transport R1.

The detection point DP is spaced from the scan position SP2 by a predetermined distance D1. The distance D1 is set at such a value that the time required for an article to be transported from detection point DP to scan position SP2 is no less than the response time required for changing the focal position of the laser light emitted from the first scan unit 50A or second scan unit 50B. Specifically, the height detection unit 52 will detect the height of an article in an amount of time less or equal to the time it takes to present the article in the scan position SP2. Since the scan position SP1 is very close to the detection point DP, the height detection unit 52 will detect the height of the article immediately before it is presented in the scan position SP1.

When the height detection unit 52 detects the height of the article, a signal indicative of the result of this detection is fed to the control unit 51. In response to this signal, the control unit 51 will switch the focal positions of the first and second scan units 50A and 50B to those which are associated with the results of the height detection unit 52. Thus, in the second embodiment, the focal positions of laser beams emitted from the two scan units 50A and 50B will be switched simultaneously.

FIGS. 5(a) through 5(d) are diagrams showing the time sequence of the operation of the bar code reader shown in FIG. 4. Articles A and B are transported by the conveyor belt 20 at a constant speed in the direction of transport R1. When the leading edge of article A reaches the detection position DP as shown in FIG. 5(a), the height detection unit 52 supplies the control unit 51 with a signal indicative of the height of article A. At this point of time, the laser beams L1 and L2 from the scan units 50A and 50B are focused at position "C" which is associated with the surface of the conveyor belt 20.

Upon receiving the output signal of the height detection unit 52, the control unit 51 will change the focal positions of scan units 50A and 50B from a "0" to "3" state. As a result, the focal position of each scan unit will assume the value "3" after a certain response time. Because of this response time, the part of article A which is near its leading edge has already passed the scan position SP1 by the time the focal position of scan unit 50A is set at the value "3". In other words, if the bar code to be read is near the leading edge of article A, it may not be possible to read this bar code by scanning with scan unit 50A.

However, in the state shown in FIG. 5(b) where the leading edge of article A has reached scan position SP2 which is downstream of scan position SP1 in the direction of transport R1, the focal positions of scan units 50A and 50B have both changed to assume state "3" which is associated with the top surface of article A. This is because the distance D1 between the detection point DP and scan position SP2 is set to be adequately long as already mentioned above. Therefore, if the bar code to be read is near the leading edge of article A, it can be effectively read by scan unit 50B. If the bar code is formed in a region extending from the center to the neighborhood of the trailing edge of the article, it can be effectively read by scan unit 50A.

If articles A and B are further transported to reach the state shown in FIG. 5(c), the height detection unit 52 detects the height of article B. In response to this detection, the control unit 51 changes the focal positions of scan units 50A and 50B simultaneously. In other words, the focal position of each focal unit is switched from state "3", which is associated with the top surface of article A, to state "2", which is associated with the top surface of article B. This switching may be done during the period for which the top surface of article A is scanned with the scan unit 50B (see FIG. 5(d)) but this is not a problem at all. For the process of reading the bar code which is formed in the region extending from the center to the vicinity of the trailing edge of the article A has already been accomplished by scanning with the scan unit 50A.

As discussed above, the second embodiment of the present invention is characterized in that the top surface of an article being transported on the conveyor belt 20 is scanned by first scan unit 50A in the scan position SP1, which is close to the height detection unit 52, whereas second scan unit 50B scans the top surface of the article in the scan position SP2 which is spaced from the detection point DP by the predetermined distance D1. This insures that the bar code formed in the leading edge portion of the article is read effectively by scanning with the scan unit 50B whereas the bar code formed in the region extending from the center to the trailing edge portion of the article is read by scanning with the scan unit 50A. As a result, the bar codes formed in a certain position on the top surfaces of articles A and B can be read effectively even if they are transported with little or no intervals provided in between them. In addition, the use of only two scan units 50A and 50B prevents the overall system from becoming unduly complex in construction.

FIG. 6 is a diagram showing the configuration of a bar code reader that adopts an optical scanner according to a third embodiment of the present invention. In FIG. 6, those parts which correspond to the parts shown in FIG. 5 are identified by like numerals and symbols. In the first and second embodiments, the first and second scan units 50A and 50B generate laser beams in a direction substantially perpendicular to the surface of the conveyor belt 20; however, in the third embodiment, the first and second scan units 50A and 50B emit laser beams L1 and L2, respectively, in directions that are inclined with respect to the conveyor belt 20.

Stated more specifically, the first scan unit 50A generates laser beam L1 which is directed towards the surface of the conveyor belt 20 in such a way that it looks downstream of the direction of transport R1 whereas the second scan unit 50B generates laser beam L2 which is directed towards the surface of the conveyor belt 20 in such a way that it looks upstream of the direction of transport R1.

As a result, the scan position S11 where the first scan unit 50A scans the taller article A will be offset from the scan position S12 (where the first scan unit 50A scans the shorter article B) by distance Δ1 upstream of the direction of transport R1. The relationship is reversed in the case of the second scan unit 50B; the scan position S21 for scanning the taller article A will be offset from the scan position S22 for scanning the shorter article B by distance Δ2 (which may be equal to Δ1 in a typical case) downstream of the direction of transport R1. The distances Δ1 and Δ2 are set at such values that the time required for each article to be transported these distances will be longer than the response time required for changing the focal positions of the scan units 50A and 50B. In other words, the angles by which the laser beams L1 and L2 are inclined from the surface of the conveyor belt 20 are set so as to provide distances Δ1 and Δ2 that satisfy the above-stated condition.

When two articles are transported successively in the third embodiment under consideration, the control unit 51 selects either the scan unit 50A or 50B depending upon whether the height of the article as detected by the height detection unit 52 changes from "high" to "low" or from "low" to "high". The selected scan unit is then operated to read the bar code on the later transported article.

The selective operation of the scan units 50A and 50B is described below specifically with reference to FIGS. 7(a) through 7(d) and 8(a) through 8(d).

FIG. 7(a) shows the case of transporting articles A and B in that order. In this case, the bar code formed on the top surface of the later article B is read by scanning with the first scan unit 50A. The process is explained more specifically below. First, when the article A reaches the detection point DP where its height is detected by the height detection unit 52 (see FIG. 7(a)), the control unit 51 supplies the scan units 50A and 50B with a control signal for altering their respective focal positions to the value "3" which is associated with the height of article A. In response to this control signal, the focal position of each scan unit is set to the value "3" before the state shown in FIG. 7(b) is reached (i.e. before the leading edge of article A arrives at scan position S11).

Thereafter, as shown in FIG. 7(b), the article B reaches the detection point DP and a signal indicative of its height is supplied to the control unit 51. Recognizing the change from "high" to "low" in the article's height, the control unit 51 will decide to use the first scan unit 50A for reading the bar code on the article B. Further, the control unit 51 computes the timing of producing a control signal for switching the focal positions to the value "2" which is associated with article B. Further, timed with the trailing edge of the article A, which passes the scan position S11 (as in the state shown in FIG. 7(c)), the control unit 51 supplies both first and second scan units 50A and 50B with a control signal for switching their focal positions to the value "3" which is associated with the height of article A. In response to this control signal, the focal position of each scan unit is set to the value "3" before the state shown in FIG. 7(b) is reached (i.e., the leading edge of article A arrives at scan position S11). As a result, the focal position of the first scan unit 50A has been set to the value "2" by the point of time when the leading edge of article B reached the scan position S12 which is downstream of the scan position S11 (as in the state shown in FIG. 7(d)).

Thus, the article A can be scanned effectively by the first and second scan units 50A and 50B whereas the article B is scanned effectively by the first scan unit 50A. If desired, the light source in the second scan unit 50B may be turned off at the point of time when its scanning of article A ends, so that the article B is scanned only by the first scan unit 50A. However, in order to assure positive reading, switching of the focal position of the first scan unit 50A is preferably accompanied by simultaneous switching of the focal position of the second scan unit 50B, so that the article B is scanned not only by the first scan unit 50A but also by the second scan unit 50B.

Figure 8A:
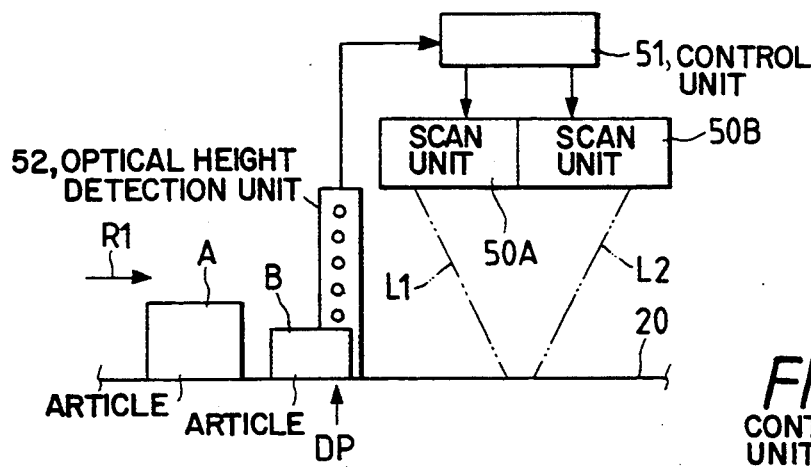
FIGS. 8(a) through 8(d) are diagrams showing the time sequence of the second half of the process of reading bar codes according to the third embodiment of the invention.
Figure 8B:
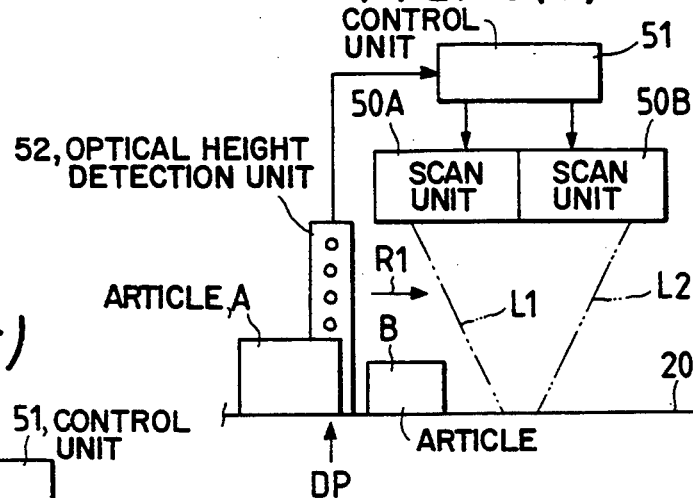

There is also the case where article B is transported before article A. This case is described below in detail with reference to FIGS. 8(a) through 8(d). When the article B reaches the detection point DP (as in the state shown in FIG. 8(a)), the control unit 51 supplies both the first and second scan units 50A and 50B with a control signal for switching the focal position of each scan unit to the value "2" which is associated with the top surface of the article B. Thereafter, the article A reaches the detection point DP as shown in FIG. 8(b); then, the control unit 51 recognizes the change from "low" to "high" in the article's height and decides to use the second scan unit 50B for reading the bar code on the article A. Further, the control unit 51 computes the timing of outputting a control signal for switching the focal position of the second scan unit 50B to the value "3" associated with the top surface of article A.

Figure 8C:
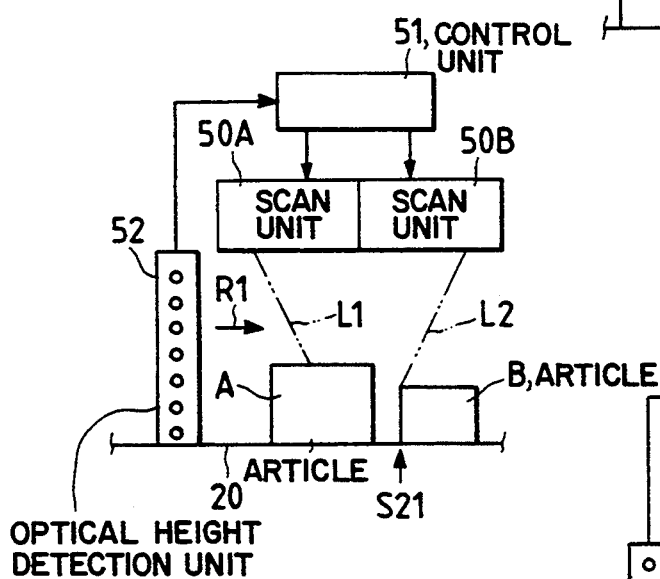
Figure 8D:
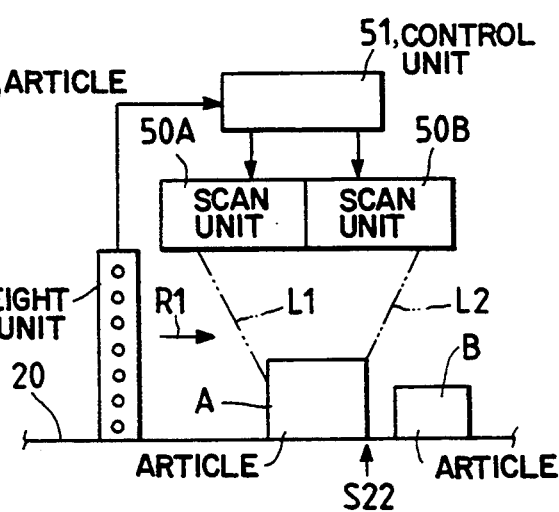

Timed with the trailing edge of article B, which passes the scan position S21 (see FIG. 8(c)), the control unit 51 supplies both the first and second scan units 50A and 50B with a control signal for switching their focal positions to the value "3". As a result, the focal position of the second scan unit 50B has been set to the value "3" by the point of time when the leading edge of the article A reached the scan position S22 which is downstream of the scan position S21 (as in the state shown in FIG. 8(d)).

As a result, the bar code formed on the top surface of the article A can be read effectively by scanning with the second scan unit 50B. It should be noted here that as in the case of transporting the article A before article B, the light source in the first scan unit 50A may be turned off at the point of time when its scanning of article B ends, so that the article A is scanned only by the second scan unit 50B.

Thus, in the third embodiment, laser beams L1 and L2 are generated from the first and second scan units 50A and 50B, respectively, in directions that are inclined with respect to the surface of the conveyor belt 20. The response time required for altering the focal positions of both scan units is effectively absorbed by taking advantage of the fact that the positions in which the articles are scanned by laser beams L1 and L2 vary with the article's height. As a consequence, there will be no failure to read all bar codes that are formed on the top surfaces of articles that are transported in succession at very close intervals.

It should also be noted that in the third embodiment, the time required to alter the focal positions of the first and second scan units 50A and 50B is determined by calculation on the basis of the timing with which the article's height was detected by the height detection unit 52. Specifically, it is on the basis of the speed of transport of articles by the conveyor belt 20 that the control unit 51 determines the time required for outputting the control signal for altering the focal position after the detection output of the height detection unit 52 changes. Therefore, considering errors such as those in the transport by the conveyor belt 20, the control signal will not necessarily be supplied with the appropriate timing. Under the circumstances, one may modify the third embodiment to construct a system as shown in FIG. 9.

Figure 9:
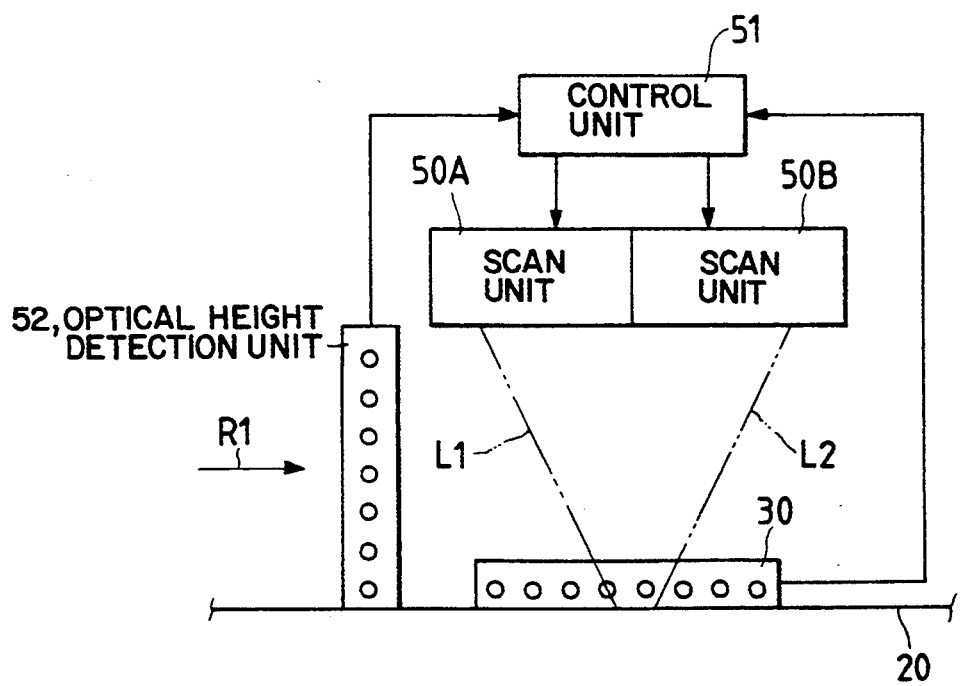
FIG. 9 is a diagram showing the configuration of a modification of the third embodiment.

The system shown in FIG. 9 is characterized by inclusion of a position detecting unit 30 that is provided in the direction of transport R1 by the conveyor belt 20 for detecting the position of articles. This position detecting unit 30 may be a device that has the same construction as the height detection unit 52 except that it is placed horizontally rather than vertically. An output signal from the position detecting unit 30 is supplied to the control unit 51.

If the article's height as detected by the height detection unit 52 changes, the control unit 51 selects either the first scan unit 50A or the second scan unit 50B while monitoring the position of the trailing edge of the first transported article on the basis of the output of the position detecting unit 30. Then, in response to the fact that said trailing edge has passed the position of scanning by the scan unit 50A or 50B, the control unit 51 switches the focal position of each scan unit to the value that is associated with the next coming article. If the article A is transported before the article B, the control unit 51 will select the scan unit 50A in order to scan the later transported article B. In this case, the focal position of the scan unit 50A will be switched to the B-associated value "2" with the timing at which the position detecting unit 30 detects the trailing edge of article A passing the scan position S11.

This system which comprises detecting the article's position and altering the focal position of a selected scan unit on the basis of the result of that detection insures that the bar codes formed on the top surfaces of articles can be read more positively.

Figure 10:
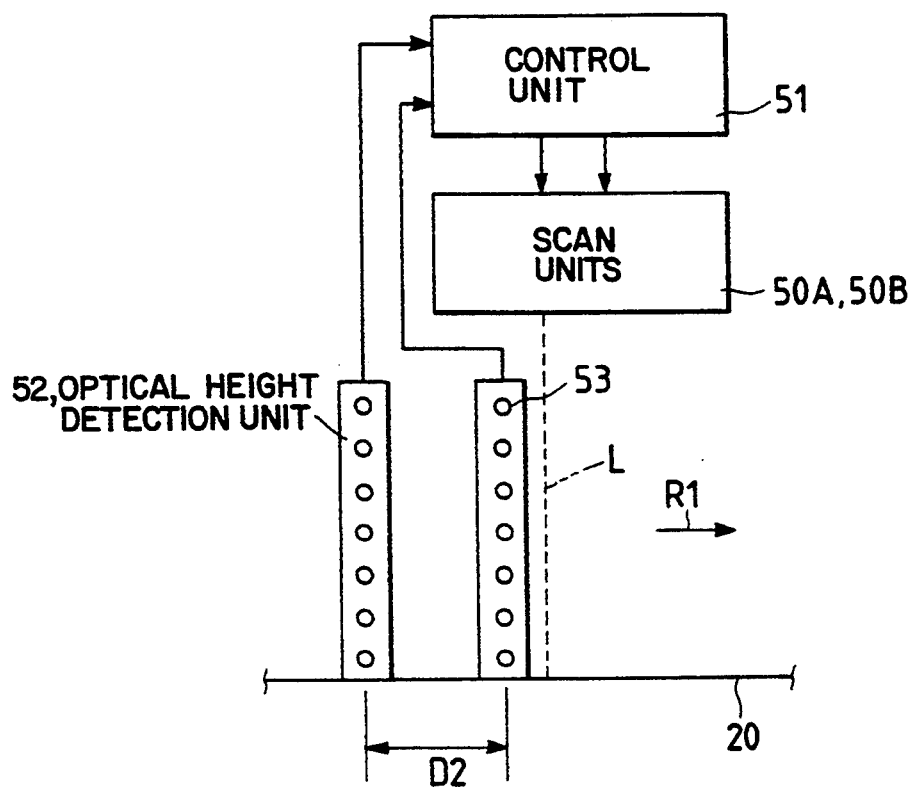
FIG. 10 is a diagram showing the configuration of a bar code reader that adopts an optical scanner according to a fourth embodiment of the present invention.

FIG. 10 is a diagram showing the configuration of a bar code reader that adopts an optical scanner according to a fourth embodiment of the present invention. In FIG. 10, those parts which correspond to the parts shown in FIG. 1 are identified by like numerals and symbols.

In this fourth embodiment, another height detection unit 53 is provided in a position downstream of the height detection unit 52 in the direction of transport R1. The height detection unit 53 has the same construction as the height detection unit 52 and is spaced therefrom by a predetermined distance D2.

The control unit 51 controls the focal position of the first scan unit 50A in response to the output signal from the height detection unit 52 which is equivalent to a first range-finding means, whereas the focal position of the second scan unit 50B is controlled in response to the output signal from the height detection unit 53 which is equivalent to a second range-finding means.

In this arrangement, articles are transported at a constant speed on the conveyor belt and, hence, the focal position of the second scan unit 50B will be switched with a certain time lag behind the switching of the focal position of the first scan unit 50A. As a result, the optical scanner according to the fourth embodiment will operate in the same manner to achieve the same advantage as in the first embodiment shown in FIG. 1.

Figure 11:
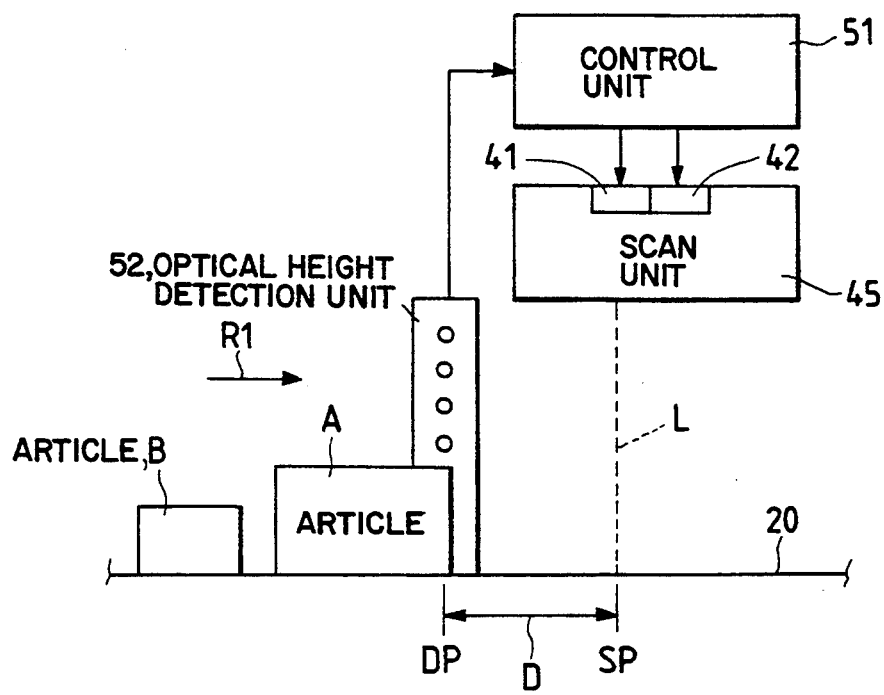
FIG. 11 is a diagram showing the configuration of a bar code reader that adopts an optical scanner according to a fifth embodiment of the present invention.
Figure 12A:
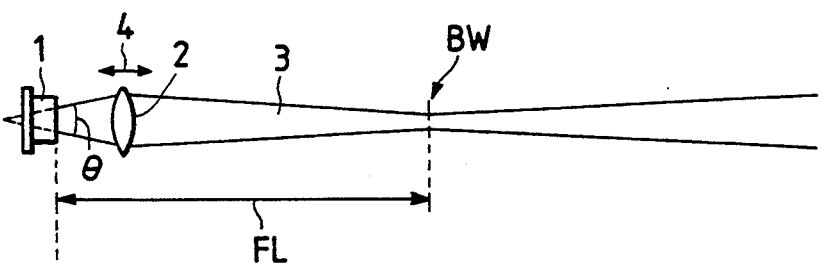
FIGS. 12(a) and 12(b) are diagrams showing a prior art technique for changing the focal length of laser light.
Figure 12B:
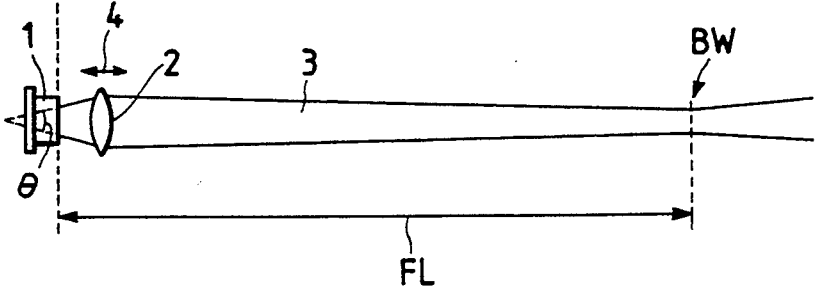

FIG. 11 is a diagram showing the configuration of a bar code reader that adapts an optical scanner according to a fifth embodiment of the present invention. In FIG. 11, those parts which correspond to the parts shown in FIG. 1 are identified by like numerals and symbols. In this fifth embodiment, the bar codes on the top surfaces of articles being transported on the conveyor belt 20 are scanned by a single scan unit 45 having two light source sections 41 and 42.

Each of the light source sections 41 and 42 comprises a semiconductor laser as a light source, a condenser lens that condenses the light from the laser to form a laser beam L, and lens drive means for changing the distance between the condenser lens and the semiconductor laser. The scan unit 45 also includes a polygonal mirror by which the laser beams L1 and L2, as emitted from the light source sections 41 and 42, are reflected towards the conveyor belt 20, and drive means such as a motor for rotating the polygonal mirror. With this arrangement, the laser beams L1 and L2, as emitted from the light source sections 41 and 42, are allowed to fall on the same face of the polygonal mirror, which rotates to change the optical paths of those beams at every moment, whereby the bar codes formed on the top surfaces of the articles will be scanned in the scan position SP.

The control unit 51 controls the light source sections 41 and 42 to turn on and off the respective semiconductor lasers. At the same time, the control unit 51 controls the lens drive means to change the focal positions of the laser beams from the respective light source sections 41 and 42. Thus, the control unit 51 functions not only as drive control means but also as light source control means.

In the case where articles A and B are transported at very short intervals, article A will first be detected by height detection unit 52. The control unit 51 then controls the lens drive means in the light source section 41 so that the focal position of the laser beam it generates is switched to the value "3" associated with article A. The detection point DP where the article's height is detected by the height detection unit 52 is spaced from the scan position SP by the predetermined distance D, so the switching of the focal position of the laser beam from the light source section 41 has ended by the point of time when the leading edge portion of article A reaches the scan position SP.

The control unit 51 turns on the semiconductor laser as the light source in the light source section 41 earlier than the time when article A reaches the scan position SP. As a result, the bar code formed on the top surface of article A will be read by scanning with the laser beam L1 as generated from the light source section 41.

On the other hand, if article B reaches the height detection unit 52, the control unit 51, while maintaining the light source section 41 as it is, controls the lens drive means in the light source section 42 so that the focal position of the laser beam it generates is changed to the value "2". It should be noted here that when the change to value "2" occurs, the semiconductor laser light source in the light source section 42 is off.

If article B reaches the scan position SP, the control unit 51 turns off the semiconductor laser L1 in the light source section 41 and turns on the semiconductor laser L2 in the light source section 42. As a result, the bar code formed on the top surface of article B is read by scanning with the laser beam L2 generated from the light source section 42.

Thus, in the fifth embodiment under consideration, the lens drive means in the light source sections 41 and 42 are controlled alternately in accordance with the height of the article that passes the detection point DP. Before the individual articles reach the scan position SP, the focal position of either laser beam L1 or L2, as emitted from either one of the light source sections 41 and 42, will be brought into agreement with the result of detection by the height detection unit 52. As a result, the semiconductor laser in whichever focused light source section 41 or 42 is selectively driven.

Thus, in the fifth embodiment, the bar codes formed on articles that are transported at very short intervals can be efficiently read using a simple system configuration. As a further advantage, the semiconductor lasers in the light source sections 41 and 42 will not be lit simultaneously but alternately. This not only provides ease in the process of recognizing bar codes with the reflected light from the top surfaces of the articles, it also reduces the required power consumption.

The foregoing description of the fifth-embodiment of the present invention is directed to the case where the single scan unit 45 has two light source sections 41 and 42, but it should be understood that two scan units 50A and 50B may be selectively operated depending upon the output of the height detection unit 52. Stated more specifically, if the article's height as detected by the height detection unit 52 changes, the focal position of either one of the two scan units 50A and 50B is adjusted to the detected height. If the height detection unit 52 detects another change in the article's height, the focal position of the other scan unit may be adjusted to the detected height. Thus, the focal positions of the two scan units are alternately changed every time the article's height as detected by the height detection unit 52 varies and, by so doing, bar codes formed on the top surfaces of the articles can be read even when transported at very short intervals.

While the five embodiments of the present invention have been described on the foregoing pages, it should be understood that they are by no means intended to be limiting. In the embodiments described above, the focal position of a scan unit 50A or 50B is altered by varying the distance between the semiconductor laser as the light source and the condenser lens. However, instead of changing the relative positions of the semiconductor laser and the condenser lens, the optical pathlength from the condenser lens to the object to be scanned may be altered to achieve the same result (see Japanese Patent Unexamined Publication No. Hei 4-250585).

In the foregoing embodiments, a polygonal mirror is used to change the optical paths of laser beams, but it may be replaced by a single mirror system or a prism that rotates at a constant speed or a mirror that pivots reciprocally about a predetermined longitudinal axis.

In the first to the fourth embodiments, the two scan units 50A and 50B each have a semiconductor laser as a light source, a condenser lens that condenses the laser light from the light source to form a laser beam, and a polygonal mirror. Yet, instead of using two polygonal mirrors, a single polygonal mirror may be shared by the laser beams from the two light sources.

The foregoing embodiments assume that articles are scanned by scan units in a direction perpendicular to the direction of transport R1. If desired, scanning may be done in such a way as to form a plurality of scan lines on the top surface of each article that differ in direction by predetermined angles. The first and fourth embodiments assume that two scan units 50A and 50B scan the top surface of each article in the same position; however, the scanning positions of the two scan units 50A and 50B need not be completely identical but may be offset in a direction that is either parallel to or crossed with the direction of transport R1. Alternatively, the two scan units may scan in different directions. This also applies to the case of the fourth embodiment in which scanning is done with the laser beams as generated from two light source sections.

Two scan units are used in the first to fourth embodiments but three or more scan units may optionally be used. Take, for example, the first embodiment; in this case, the focal positions of three or more scan units may be changed sequentially at predetermined time intervals. In the case of the second embodiment, three or more scan units may be arranged in such a way that their scan positions differ in the direction of transport R1. In the case of the third embodiment, a third scan unit may be provided with the scan position being set downstream of the positions of scanning with the scan units 50A and 50B as taken in the direction of transport R1. In the case of the fourth embodiment, three or more height detection units may be provided in association with three or more scan units in such a way that they will furnish the timing of altering the focal positions of the respective scan units. Similarly, in the case of the fifth embodiment, three or more light source sections may be used in such a way that either one of these light source section is selected and varied in focal position in accordance with the output of the height detection unit 52.

The above description of the five embodiments concerns the case where the optical paths of laser beams are varied at every moment to achieve rapid scanning of bar codes. If desired, a point source of light that emits a laser beam towards the conveyor belt in a given optical path may be used and bar codes may be scanned by taking advantage of the change that occurs in the relative positions of the bar code and the exposure to the light from the point source as the articles are continuously transported by the conveyor belt. In other words, the scanning means does not have to include a polygonal mirror or other devices for insuring more positive scanning of the object of interest.

In the first and second embodiments described above, the focal positions of laser beams are switched in immediate response to the detection by the height detection unit 52. If desired, the article's position may be detected by a device having a similar construction to what is shown in FIG. 9, so that the focal positions of laser beams are switched at the point of time when the article was transported up to a predetermined position. The major advantage of this modification is that it eliminates the need to set a strict positional relationship between the height detection unit 52 and the scan position SP.

Figure 13:
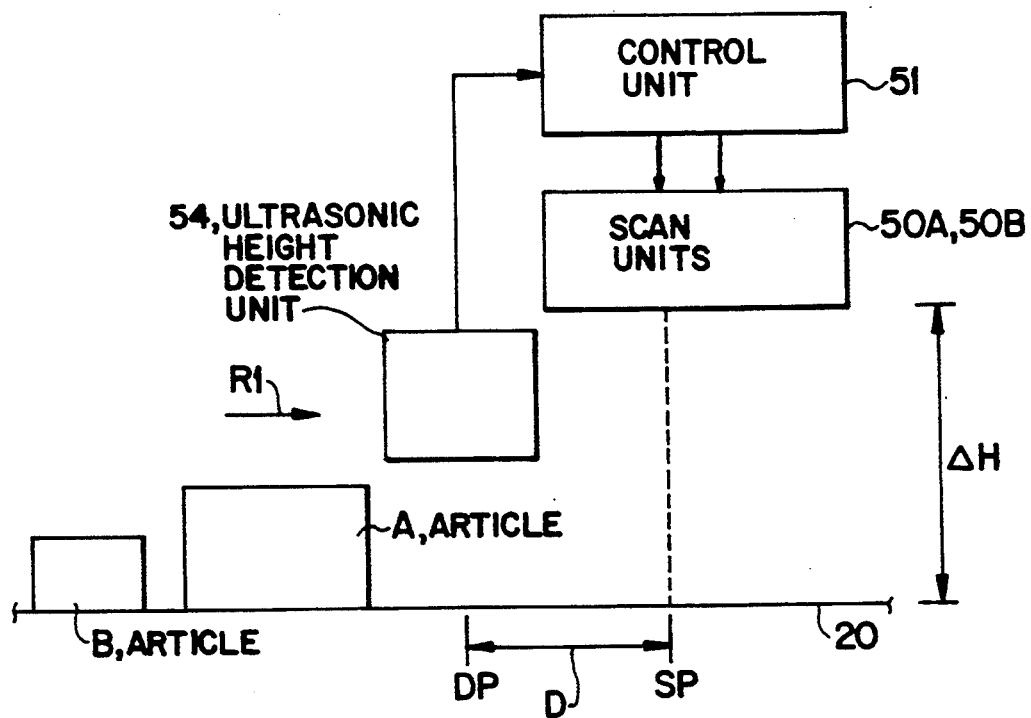
FIG. 13 is a diagram showing the configuration of a bar code reader that adopts an optical scanner, using an ultrasonic height detection unit, according to a first embodiment of the present invention

In the foregoing embodiments, the combination of light-emitting and light-receiving devices is used to detect the height of an article being transported, whereby the distance between the top surface of the article and the associated scan. Alternatively, as shown in FIG. 13, an ultrasonic height detection unit 54 can be used to transmit an ultrasonic wave towards the top surface of the article and measure the time for the reflected ultrasonic wave to return to the detection unit so that the distance between the scan unit and the top surface of the article is detected directly.

Another feature of the foregoing embodiments is that the scan unit scans the top surface of each article that is transported. In the case where bar codes are formed on a lateral side of the articles, the scan unit may be provided on one side of the belt conveyor so that it generates a laser beam that is applied towards the lateral side of each article which carries the bar code to be read.

In these embodiments, the bar codes formed on the top surfaces of articles being transported by the conveyor belt are scanned by the scan unit or units that are fixed above the conveyor belt. However, the concept of the present invention is also applicable to a system that generates a laser beam from a portable enclosure, thereby scanning bar codes and other symbols. In this case, the operator will manually move the enclosure to vary the scan region so that the object to be scanned is presented in the appropriate scan region.

The foregoing description of the embodiments of the present invention concerns the case of reading bar codes but it should be understood that the present invention can readily be applied to the case of reading other symbols and characters by optical scanning. The invention is applicable to any other systems that perform scanning with light.

It should also be noted that various other design alterations can be made without departing from the scope and spirit of the present invention.

What is claimed:

1. An optical scanner for scanning objects with informative symbols upon their surface, comprising:
   a plurality of scanning means for reading said informative symbols on one of said objects with scanning light when said one of said objects is disposed within a predetermined scan region, a focal position of said scanning light capable of being varied independently in each said scanning means within a predetermined response time;
   means for transporting said objects in a successive fashion through said scanning means;
   first means for detecting a height of said objects as they are transported by said transporting means, said first detecting means positioned at a predetermined distance from said plurality of scanning means so that an amount of time required to transport said objects from said detecting means to said predetermined scan region is greater or equal to said response time of said plurality of scanning means; and
   means for controlling said focal position of said scanning light in response to said first detecting means so as to provide an accurate reading of said informative symbols by said plurality of scanning means.

2. An optical scanner according to claim 1, further comprising second means for detecting a height of said objects as they are transported by said transporting means, wherein a focal position of scanning light produced by a first of said plurality of scanning means is controlled on the basis of said first detecting means and a focal position of scanning light produced by a second of said plurality of scanning means is controlled on the basis of said second detecting means.

3. An optical scanner according to claim 1, wherein said transport means comprises a conveyor belt upon which said objects are placed.

4. An optical scanner according to claim 1, wherein said height detecting means comprises a plurality of pairs of light emitting diodes and light receiving devices arranged in a vertical manner at predetermined intervals.

5. An optical scanner according to claim 1, wherein said height detecting means comprises means for transmitting an ultrasonic wave against said objects and detecting an amount of time needed for said ultrasonic wave reflected off of said objects to return to said height detecting means.

6. An optical scanner for scanning a plurality of objects with informative symbols upon their surface, comprising:

first scanning means for reading said informative symbols on one of said objects with a first scanning light when said one of said objects is disposed within a first predetermined scan region, a focal position of said first scanning light capable of being varied within a predetermined response time;

second scanning means for reading said informative symbols on one of said objects with a second scanning light when said one of said objects is disposed within a second predetermined scan region, a focal position of said second scanning light capable of being varied within said predetermined response time;

means for transporting said objects in a successive fashion through said first scanning means and then said second scanning means;

means for detecting a height of said objects as they are transported by said transporting means, said detecting means positioned at a predetermined distance from said first and second scanning means so that an amount of time required to transport said objects from said detecting means to said second predetermined scan region is greater or equal to said response time of said first and second scanning means; and control means for simultaneously adjusting said focal position of said first and second scanning light in response to said detecting means so as to provide an accurate reading of said informative symbols by said plurality of scanning means.

7. An optical scanner for scanning a plurality of objects with informative symbols upon their surface, comprising:

means for transporting said objects in a successive manner;

first scanning means, disposed above said transporting means, for reading said informative symbols on one of said objects with a first scanning light emitted at an angle inclined from a perpendicular direction of said transporting means, said angle being set so that a predetermined response time needed to vary a focal position of said first scanning light is less than an amount of time needed to traverse a distance between a first position, where said scanning light will initially read a tall object, and a second position, where said scanning light will initially read a short object;

second scanning means, disposed above said transporting means and next to said first scanning means, for reading said informative symbols on one of said objects with a second is scanning light emitted at an angle inclined from a perpendicular direction of said transporting means, said angle being set so that said predetermined response time needed to vary a focal position of said second scanning light is less than an amount of time needed to traverse a distance between a third position, where said second scanning light will initially read a short object, and a fourth position, where said scanning light will initially read a tall object;

means for detecting a height of said objects before they are transported by said transporting means through said first and second scanning means control means for adjusting said focal position of said first and second scanning light in response to said detecting means, and selecting one of said first or second scanning means to read said informative symbols, wherein said first scanning means is selected if said one of said objects to be scanned is taller than a preceding object and said second scanning means is selected if said one of said objects to be scanned is shorter than said preceding object.

8. An optical scanner according to claim 7, further comprising:

a position detector for detecting when a trailing edge of one of said objects has passed beyond a scanning region of one of said first and second scanning means; and wherein said control means adjusts said focal position of said scanning light of one of said first and second scanning means when said position detector indicates that said trailing edge has passed beyond said scanning region of said one of said first and second scanning means.

9. An optical scanner for scanning a plurality of objects with informative symbols upon their surface, comprising:

scanning means for reading said informative symbols on one of said objects with scanning light when said one of said objects is disposed within a predetermined scan region, said scanning means including first and second light source sections whose focal position of their respective scanning light is capable of being varied within a predetermined response time;

means for transporting said objects in a successive fashion through said scanning means;

means for detecting a height of said objects as they are transported by said transporting means, said detecting means positioned at a predetermined distance from said scanning means so that an amount of time required to transport said objects from said detecting means to said predetermined scan region is greater or equal to said response time of said scanning means; and means for controlling said focal position of said first and second light source sections in response to said detecting means so as to provide an accurate reading of said informative symbols by said plurality of scanning means.

10. An optical scanner according to claim 9, wherein said control means activates only one of said first and second light source sections at any one time on the basis of said detected height of said objects.

11. An optical scanner according to claim 9, wherein each of said first and second light source sections includes a semiconductor laser for use as a light source, a condenser lens for forming a laser beam, and lens drive means for adjusting a distance between said condenser lens and said semiconductor laser.

12. An optical scanner for scanning a plurality of objects with informative symbols upon their surface, comprising:

a plurality of scanning means for reading said informative symbols on one of said objects with scanning light when said one of said objects is disposed within a predetermined scan region, a focal position of said scanning light capable of being varied within a predetermined response time;

means for transporting said objects in a successive fashion through said scanning means;

means for detecting a height of said objects as they are transported by said transporting means;

means for detecting a position of said one of said objects, said position detecting means located at a predetermined distance from said plurality of scanning means so that an amount of time required to transport said objects from said position detecting means to said predetermined scan region is greater or equal to said response time of said plurality of scanning means; and means for controlling said focal position of said scanning light in response to said height detecting means and said position detecting means so as to provide an accurate reading of said informative symbols by said plurality of scanning means.

* * * * *